United States Patent
Ouchi et al.

(10) Patent No.: US 6,488,589 B2
(45) Date of Patent: Dec. 3, 2002

(54) APPARATUS FOR DRIVING WHEEL OF AUTOMOBILE

(75) Inventors: Hideo Ouchi, Fujisawa (JP); Shigeoki Kayama, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/781,161

(22) Filed: Feb. 13, 2001

(65) Prior Publication Data

US 2002/0086736 A1 Jul. 4, 2002

(30) Foreign Application Priority Data

Feb. 16, 2000 (JP) ........................ 2000-037656

(51) Int. Cl.$^7$ ................................. F16D 3/84
(52) U.S. Cl. ........................ 464/178; 467/906
(58) Field of Search ................... 464/145, 178, 464/906; 301/105.1, 111, 112; 403/298, 359.1

(56) References Cited

U.S. PATENT DOCUMENTS

| | | | |
|---|---|---|---|
| 4,506,422 A | * 3/1985 | Egusa | 384/450 X |
| 4,881,842 A | 11/1989 | Farrell et al. | |
| 5,492,417 A | 2/1996 | Baker et al. | |
| 5,509,857 A | * 4/1996 | Flaugher | 464/145 |
| 5,674,011 A | 10/1997 | Hofmann et al. | |
| 5,720,530 A | 2/1998 | Holsnijders et al. | |
| 5,975,767 A | * 11/1999 | Mizukoshi et al. | 464/145 X |
| 6,135,571 A | * 10/2000 | Mizukoshi et al. | 464/178 X |
| 6,146,022 A | * 11/2000 | Sahashi et al. | 384/544 |
| 6,280,096 B1 | * 8/2001 | Miyazaki et al. | 301/108.1 X |

FOREIGN PATENT DOCUMENTS

| | | |
|---|---|---|
| JP | 7-317754 | 12/1995 |
| JP | 2573325 | 3/1998 |

* cited by examiner

*Primary Examiner*—J. J. Swann
*Assistant Examiner*—Greg Binda
(74) *Attorney, Agent, or Firm*—Crowell & Moring LLP

(57) ABSTRACT

A wheel-drive apparatus for an automobile is provided to have an outer race fixedly connected to a suspension, a wheel-support hub having a first spline hole, an inner race fixedly fitted onto the hub, rolling members rotatable between the outer ring raceways of the outer race and the inner ring raceways of the hub and inner race, a drive shaft member having an outside end to be a spline shaft for engagement with the first spline hole and an inside end formed to be an outer ring for a constant velocity joint. A stop ring is engaged with the spline shaft and the hub to prevent the spline shaft from coming away from the spline hole. An inner ring for the constant velocity joint has a second spline hole, and balls are provided between the outside engaging groove of the outer ring and the inside engaging groove of the inner ring. A drive shaft has a male spline portion with a groove bottom in spline-engagement with the second spline hole, while the spline shaft has a base end the minimum outer diameter $D_{43}$ of which is larger than the diameter $D_{27}$ of the groove bottom of the male spline portion.

2 Claims, 5 Drawing Sheets

APPARATUS FOR DRIVING WHEEL OF AUTOMOBILE

BACKGROUND OF THE INVENTION

1. Field of the Invention

This invention relates to an apparatus for driving a wheel of an automobile, and more particularly to a bearing unit for a wheel called a 3.5-generation hub unit in which a constant-velocity joint and hub unit are integrated into one unit. This apparatus is used for supporting a driven wheel that is supported by an independent-type suspension {front wheels for a FF car (front engine, front-wheel drive), rear wheels for a FR car (front engine, rear-wheel drive), rear wheels for a RR car (rear engine, rear-wheel drive) and all the wheels for a 4 WD car (4 wheel drive)} such that the driven wheel rotates freely with respect to suspension, as well as for rotating and driving the driven wheel.

2. Description of the Related Art

In order to support a wheel such that it can rotate freely with respect to the suspension, a wheel-support bearing unit, having an outer race and inner race that rotate freely by way of rolling members, is used. Moreover, in the independent-type suspension, the wheel-support bearing unit, which supports the driven wheel, is combined with a constant-velocity joint, and it must smoothly transmit the rotation of the drive shaft to the driven wheel (maintaining constant velocity) regardless of relative displacement between the differential gear and the driven wheel or the steering angle applied to the driven wheel. FIG. 3 shows a typical apparatus for the driven wheel of an automobile in which the wheel-support bearing unit 1 is combined with the constant-velocity joint 2.

Here, the wheel-support bearing unit 1 comprises an outer race 3 on the radially inside of which a hub 4 and inner race 5 rotate freely by way of a plurality of rolling members 6. Of these, the outer race 3 is fastened to the knuckle 8 (see FIG. 4) of the suspension by a first flange 7 that is formed around the outer surface of the outer race 3 such that it does not rotate during operation. In addition, there are rows of outer-ring raceways 9 formed around the inner peripheral surface of the outer race 3, and the hub 4 and inner race 5 are supported on the radially inside of this outer race 3 such that they are concentric with the outer race 3.

On the outside end (the outside end in the width direction of the automobile when the bearing unit is installed in the automobile, the left end in FIGS. 1 to 4) around the outer peripheral surface of the hub 4, there is a second flange 10 for supporting the wheel. Moreover, there is a first inner-ring raceway 11 formed around the outer peripheral surface in the middle of the hub 4, and likewise, the inner race 5 fits around a small-diameter section 12 that is formed on the inside end (the inside end in the width direction of the automobile when the bearing unit is installed in the automobile, the right end in FIGS. 1 to 4), and a second inner-ring raceway 13 is formed around the outer peripheral surface of the inner race 5. There is also a first spline hole 14 formed in the center of the hub 4.

On the other hand, the constant-velocity joint 2 comprises an outer ring 15 for the constant-velocity joint, an inner ring 16 for the constant-velocity joint, and a spline shaft 17. Of these, the outer ring 15 for the constant-velocity joint and the spline shaft 17 form a drive shaft member 18. In other words, this spline shaft 17 is formed on the outside end of this drive-shaft member 18, and it freely fits in the first spline hole 14 described above, and the outer ring 15 for the constant-velocity joint is formed on the inside end of the drive-shaft member 18. At a plurality of locations in the circumferential direction around the inner peripheral surface of this outer ring 15 for the constant-velocity joint, there are outside engaging grooves 19 which are formed such that they are each orthogonal with respect to the circumferential direction. Moreover, in the center of the inner ring 16 for the constant-velocity joint there is a second spline hole 20, and there are inside engaging grooves 21 that are formed such that they are each orthogonal with respect to the circumferential direction and are located around the outer peripheral surface of the inner ring 16 such that they correspond with the location of the aforementioned outside engaging grooves 19. There are balls 22 located between these inside engaging grooves 21 and outside engaging grooves 19, and they are supported by a retainer 23 such that they can roll freely along the engaging grooves 21, 19. The shape of each of the components of the aforementioned constant-velocity joint 2 are substantially the same as the well-known Rzeppa type constant-velocity joint, and is not essentially related to this invention, so a detailed description will be omitted here.

In the case of a constant-velocity joint 2 and the wheel-support roller-bearing unit 1 as described above, the spline shaft 17 is inserted into the first spline hole 14 in the hub 4 toward the outside from the inside (from right to left in the figure). Also, by screwing a nut 25 onto the male screw section 24 formed on the outside end of the spline shaft 17 on the part that protrudes from the outside end of the hub 4, and then tightening the nut 25, the hub 4 and the spline shaft 17 are fastened together. In this condition, the surface on the inside end of the inner race 5 comes in contact with the surface on the outside end of the outer ring 15 for the constant-velocity joint, so the inner race 5 does not move in a direction that would cause it to come apart from the small-diameter step section 12. At the same time, the rolling members 6 are properly pre-loaded.

Furthermore, when installed in the suspension of an automobile, the male spline 27 that is formed on the outside end of the drive shaft 26 makes a spline fit with the second spline hole 20 that is formed in the center of the inner ring 16 for the constant-velocity joint. A stop ring 29 that fits in the installation groove 28 that is formed all the way around the outer peripheral surface on the outside end of the male spline 27 fits in an anchoring step section 30 that is formed around the edge on the opening on the outside end of the second spline hole 20, and this prevents the male spline 27 from coming out from the second spline hole 20. The output shaft section of the differential gear, not shown in the figure, is provided with the trunnion of a tripod-type constant-velocity joint, also not shown in the figure, and the inside end of the drive shaft 26 is connected to the center of the trunnion. As the automobile moves, the drive shaft 26 rotates at constant rpm, however, a thrust load is repeatedly applied in both axial directions due to the resistance of the tripod-type constant-velocity joint that occurs during rotation.

In the wheel drive apparatus for an automobile described above and shown in FIG. 3, the wheel-support roller-bearing unit 1 and constant-velocity joint 2 are fastened together by screwing and tightening a nut 25 to the screw section 24, so the weight of the unit is large. In other words, it is necessary to lengthen the splint shaft 17 by the amount of the male screw section that is formed on the spline shaft 17 on the outside of the constant-velocity joint 2, as well as a nut 25 is necessary. Therefore, the dimension in the axial direction, as well as the weight, of the wheel drive apparatus for an automobile increases by the amount of the screw section 24 and nut 25.

In regards to this, as shown in FIG. 4, U.S. Pat. No. 4,881,842 discloses a more simple construction that makes it possible to fasten the wheel-support bearing unit and constant-velocity joint in a way such that the dimension in the axial direction is shortened and the weight is reduced. In this second example of prior construction shown in FIG. 4, the hub 4 is supported on the radially inside of the outer race 3, which is fastened to the knuckle 8, such that it can rotate freely by way of the rolling members 6 that are arranged in a plurality of rows. In addition, the spline shaft 17 of the drive-shaft member 18a fits in the first spline hole 14 that is formed in the center of the hub 4. There is an installation section 31 formed on the surface of the outside end of this spline shaft 17 for attaching a fitting tool for taking the spline shaft 17 into the first spline hole 14. Also, this spline shaft 17 is prevented from coming out of the hub 4 by a stop ring 33 that is fastened in an installation groove 32 formed around the outer peripheral surface on the tip end of the spline shaft 17. In this state, an elastic ring 34 is elastically compressed between the hub 4 and the outer ring 15 for the constant-velocity joint of the drive-shaft member 18a, to prevent the spline shaft 17 from rocking and moving inside the hub 4. In this second example of prior construction, the wheel drive apparatus for an automobile is made more compact and lighter by using the stop ring 33 for connecting the wheel-support bearing unit 1a and the constant-velocity joint 2a.

In the case of the second example of prior construction described above, although the apparatus is made more compact and lighter, it is difficult to maintain adequate durability as is. The reason for this is explained below referring to FIGS. 3, 4.

When the wheel-drive apparatus for an automobile is operating and the driving power (torque) is transmitted while the center axes of the outer ring 15 and the inner ring 16 for the constant-velocity joint of the Rzeppa-type constant-velocity joint 2 (FIG. 3), 2a (FIG. 4) are not concentric (angle of intersection is not 180 degrees), then the force that acts on the balls 22, and the inside engaging grooves 21 and outside engaging grooves 19 of the constant-velocity joint 2 is no longer applied to the same horizontal surface orthogonal to the center axis. Therefore, a bending moment acts on the drive-shaft members 18 (FIG. 3), 18a (FIG. 4), and the drive shaft 26. Furthermore, in the case of unevenness in the pitch of the outside and inside engaging grooves 19, 21 due to manufacturing error, a component of load also occurs in the radial load direction as a resultant force of contact loads on the outside engaging grooves 19 and inside engaging grooves 21 and the balls 22. When a load component in the radial load direction occurs due to this kind of resultant force, the cross section of the drive-shaft members 18 (FIG. 3), 18a (FIG. 4) and the drive shaft 26 are not only equally loaded by a twisting torque and bending moment, but they are also loaded by a bending moment due to the aforementioned radial load that is multiplied with a distance in the axial direction from the balls 22 of the constant-velocity joint 2 (FIG. 3), 2a (FIG. 4).

In the case of the drive shaft 26, since the distance in the axial direction from the balls 22 of the constant-velocity joint 2 to the base end of the male spline 27, which is the weakest part, is short, so that the load due to the bending moment of the aforementioned radial load is small. On the other hand, in the case of the drive-shaft members 18 (FIG. 3), 18a (FIG. 4), the distance in the axial direction from the balls 22 of the constant-velocity joint 2 to the base end (inside end) of the spline shaft 17, which is the weakest part, is longer than the distance to the weakest point of the drive shaft 26. Therefore, the bending moment due to the aforementioned radial load becomes larger than the bending moment at the weakest part of the drive shaft 26. In addition, the effect of the load that acts between the outside and inside engaging grooves 19, 21 and the retainer 23 can also be taken into consideration, however, it is considered that the difference between the drive-shaft members 18 (FIG. 3), 18a (FIG. 4) and the weakest part of the drive shaft 26 in fatigue strength, is outstandingly affected by the bending moment due to the aforementioned radial load.

The inventors of this invention performed tests on a driven wheel apparatus for an automobile in which the wheel-support bearing units 1 (FIG. 3), 1a (FIG. 4), are combined with the constant-velocity joints 2 (FIG. 3), 2a (FIG. 4) to investigate which part received the most damage. In the test, various joint angles (supplementary angle of the intersecting axis angle) were applied to the constant-velocity joints 2 (FIG. 3), 2a (FIG. 4), and a ±1470 N·m torque was repeatedly applied to the drive shaft 26. With the spline fitting area 35 on the hub side, where the first spline hole 14 fits with the spline shaft 17, and with the spline fitting area 36 on the joint side, where the second spline hole 20 fits with the male spline 27, the small spline diameter (male bottom diameter, female peak diameter) is 24 mm, and they form a module 1. The results of the test are shown in Table 1.

TABLE 1

| Hub and constant-velocity joint connection | Joint angle | Cycles until failure (x $10^4$) | Failure location |
| --- | --- | --- | --- |
| Stop ring | | 19.1 | Base of spline shaft 17 |
| | | 29.8 | Base of spline shaft 17 |
| | 0° | 30.1 | Base of spline shaft 17 |
| | | 30.3 | Base of spline shaft 17 |
| | | 28.3 | Base of spline shaft 17 |
| | 15° | 8.0 | Base of spline shaft 17 |
| | | 11.9 | Base of spline shaft 17 |
| Nut Screwing | | 40.8 | Spider of the tripod-type constant-velocity joint |
| | | 38.4 | Base of the male spline 27 |
| | 0° | 52.3 | Base of the male spline 27 |
| | | 47.1 | Base of spline shaft 17 |
| | | 51.3 | Base of spline shaft 17 |
| | | 45.8 | Base of spline shaft 17 |
| | 6° | 53.4 | Base of the male spline 27 |

As can be clearly seen from the test results, in the case of using a nut 25, as shown in FIG. 3, to fasten the wheel-support bearing unit 1 with the constant-velocity joint 2, the spline fitting section 35 on the hub side and the spline fitting section 36 on the constant-velocity joint side are damaged at the same rate, and the number of cycles until failure was large (long life). Also, there was a case where the tripod-type constant-velocity joint was damaged before either of the spline fitting sections. On the other hand, when a stop ring 33, as shown in FIG. 4, is used to fasten the wheel-support bearing unit 1a with the constant-velocity joint 2a, the spline fitting section 35 on the hub side was damaged in all cases, and the number of cycles until failure was small (short life).

The reason that the life of the spline fitting section 35 on the hub side is short due to the difference in the connection of the wheel-support bearing units 1, 1a and constant-velocity joints 2 (FIG. 3), 2a (FIG. 4) is as follows. First, in the case of construction using a nut 25 as shown in FIG. 3, the surface on the outside end of the hub 4 and the inner surface of the washer 37 attached to the nut 25, and the surface on the inside end of the inner race 5 and the surface on the outside end of the outer ring 15 for the constant-velocity joint come in strong direct contact (friction engagement) with each other. As a result, the substantial part of the twisting torque or bending moment are supported by the respective contact surfaces, so that the twisting torque and bending moment applied to the base of the spline shaft 17 are reduced by that amount and the durability of this base is improved.

On the other hand, in the case of construction using a stop ring 33, as shown in FIG. 4, there is no strong contact (friction engagement) between the inside surface of the stop ring 33 and the surface on the outside end of the hub 4, and the surface on the inside end of the inner race 5 and the surface on the outside end of the outer ring 15 for the constant-velocity joint. The contact force is limited (small) by the elastic force of the elastic ring 34, so that the force of the friction engagement on the contact surface is small, and the amount that this portion supports the twisting torque and the bending moment is very limited. Therefore, most of the twisting torque and bending moment act on the base of the spline shaft 17. The cross-section of each surface is loaded by an uneven load, and when considering the size of the bending moment due to the aforementioned radial load, the base of the spline shaft 17 is loaded by a bending moment that is larger than the bending moment acting on the base of the male spline 27, that is formed on the outside end of the drive shaft 26, so when the shaft diameters are the same, the base of the spline shaft 17 is damaged first.

SUMMARY OF THE INVENTION

Taking the above problems into consideration, an object of this invention is to provide a wheel-drive apparatus for automobile that makes it possible to effectively maintain adequate durability even when the wheel-support bearing unit and constant-velocity joint are connected by a stop ring.

DETAILED DESCRIPTION OF THE PREFERRED EMBODIMENTS

Figure 1:
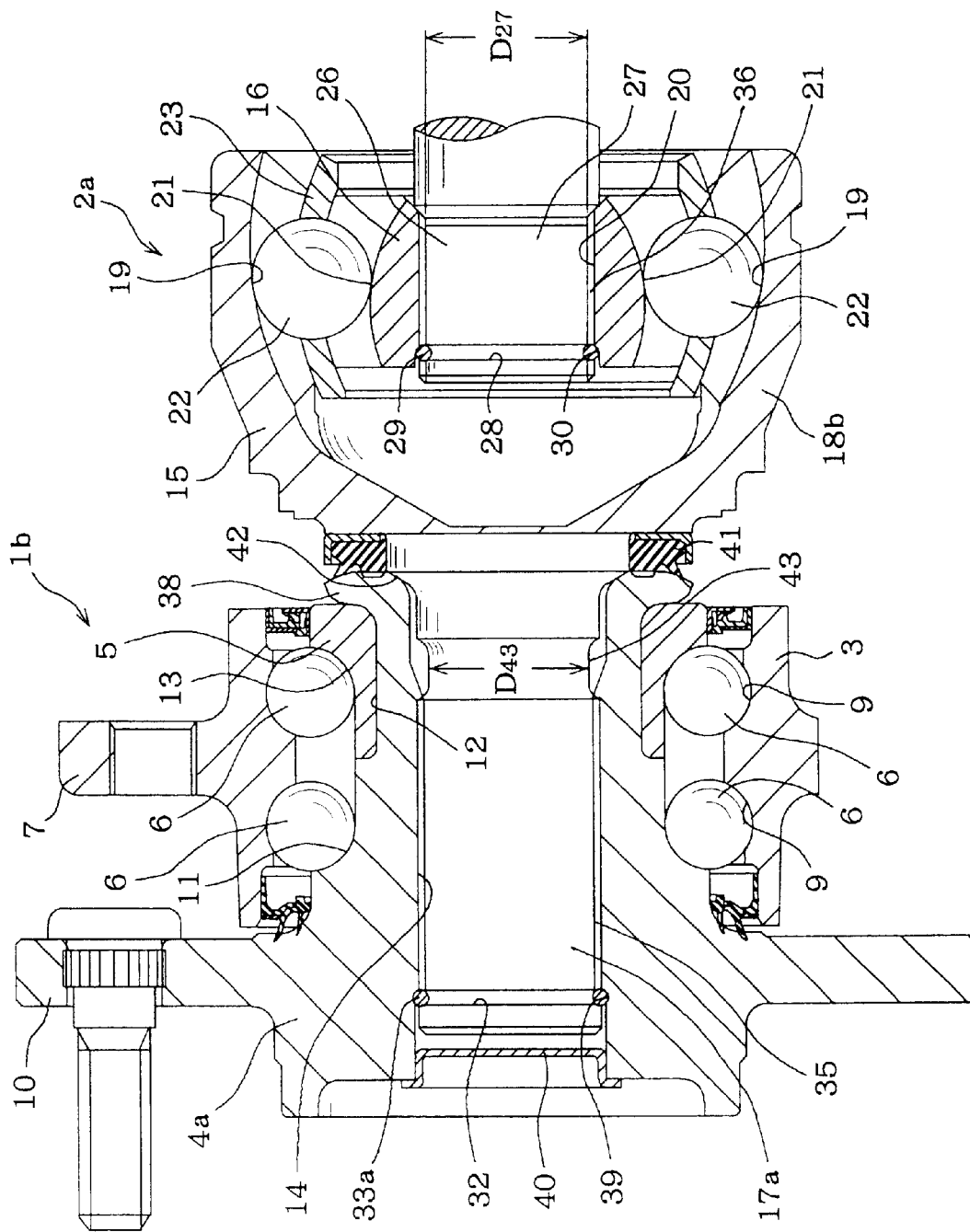
FIG. 1 is a cross sectional view showing a first example of the embodiment of the present invention.

Accordingly, the wheel-drive apparatus for automobile of this invention comprises: an outer race 3, hub 4a, a plurality of rolling members 6, a drive-shaft member 18b, stop ring 33a, outside engaging grooves, inner-ring 16 for constant-velocity joint, a plurality of balls 22 for constant-velocity joint 2a, and a drive shaft.

Of these, the outer race 3 does not rotate during operation, and comprises: a first flange 7 around its outer peripheral surface for fastening to the suspension apparatus, and a plurality of outer-ring raceways 9 around its inner peripheral surface.

Figure 1A:
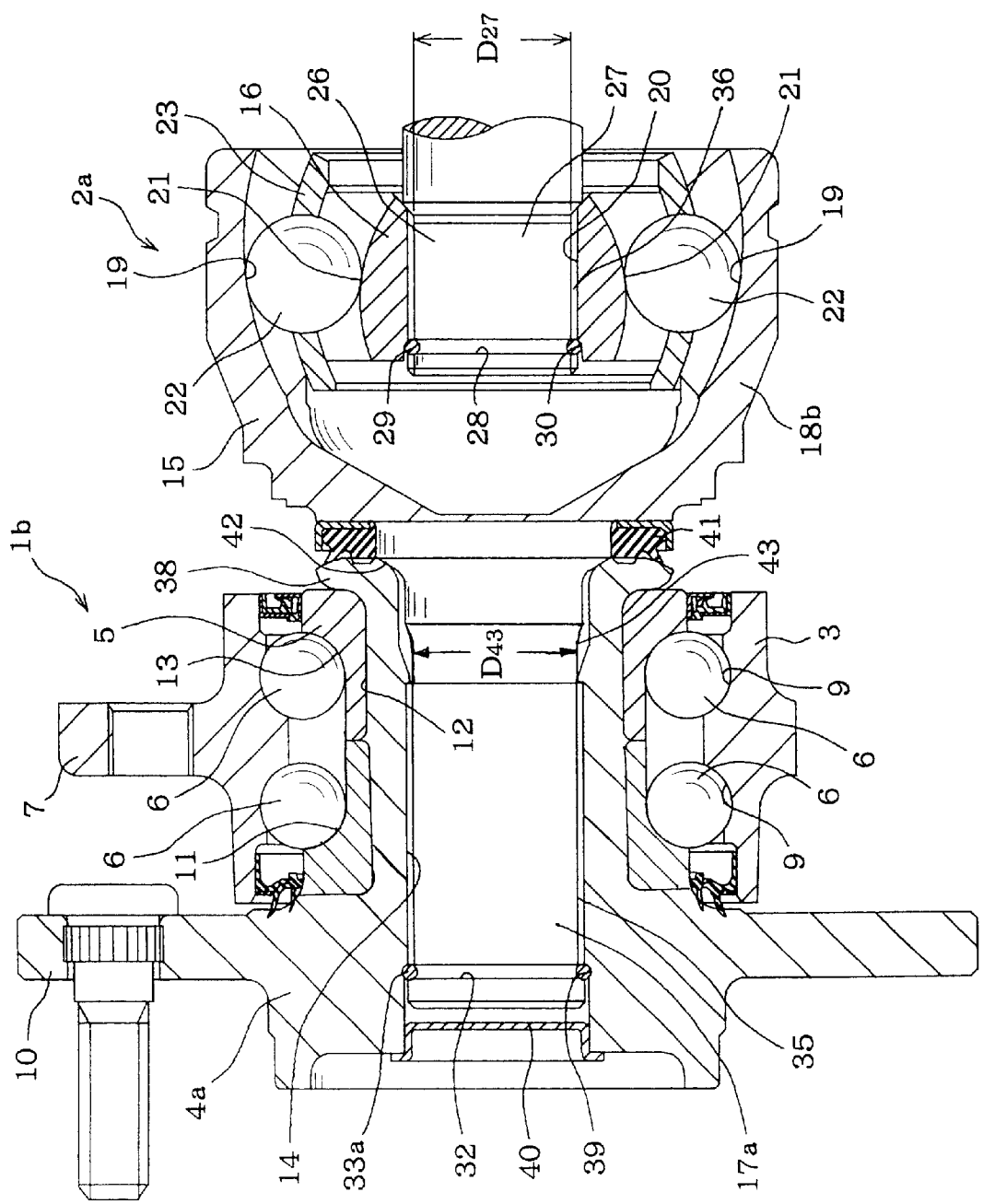
FIG. 1A is a cross sectional view showing an alternative embodiment of the first example of FIG. 1.

Moreover, the hub 4a comprises a second flange 10 around its outer peripheral surface near the outside end for supporting the wheel, a first inner-ring raceway 11 that is formed in the middle of the hub 4a directly (as can be seen in FIG. 1) or on a separate inner ring (as can be seen in FIG. 1A), a first spline hole 14 that is formed in the center of the hub 4a, and an inner ring 5, that has a second inner-ring raceway 13 formed around its outer peripheral surface, fits around and is fastened to the outer peripheral surface of the hub 4a on the inside end.

Furthermore, a plurality of rolling members 6 are located between each of the outer-ring raceways 9 and the first and second inner-ring raceways 11, 13, such that they rotate freely.

The drive-shaft member 18b comprises a spline shaft 17a, 17b on its outside end that fits in the first spline hole 14, and its inside end functions as the outer ring 15 for the constant-velocity joint.

The stop ring 33a is located between and engaged with the inner fitting section, that is formed all the way around the outer peripheral surface on the outside end of the spline shaft 17a, 17b, and the outer fitting section, that is formed around the inner peripheral surface of the hub 4a in the section that faces the inner fitting section, and this stop ring 33a prevents the spline shaft 17a, 17b from coming out of the spline hole 14.

The outside engaging grooves are located at a plurality of locations in the circumferential direction around the inner surface of the outer ring 15 for the constant-velocity joint 2a, and they are each formed such that they are orthogonal with respect to the circumferential direction.

The inner-ring 16 for the constant-velocity joint is located on the radially inside of the outer ring 15 for the constant-velocity joint, and there is a second spline hole 20 formed through its center, and on its outer peripheral surface, there are inside engaging grooves 21 that are formed such that they correspond with the outside engaging grooves 19 and are orthogonal with respect to the circumferential direction.

The balls 22 are located between the inside engaging grooves and outside engaging grooves such that they can roll freely along the grooves.

The drive shaft 26 comprises a male spline section 27 that is formed on its outside end, and the male spline makes a spline fit inside the second spline hole 20.

Furthermore, with the wheel-drive apparatus for an automobile of this invention, the minimum outer diameter of the base end of the spline shaft 17a, 17b is larger than the diameter of the groove bottom in the male spline 27 formed on the outside end of the drive shaft 26.

With the wheel-drive apparatus for an automobile of this invention, constructed as described above, it is possible to maintain the strength of the spline shaft 17a, 17b of the drive-shaft member 18b during operation even when the wheel-support bearing unit 1b and constant-velocity joint 2a are connected with a stop ring 33a, and it is possible to maintain adequate durability regardless of the twisting moment and bending moment that are repeatedly applied during operation.

Figure 3:
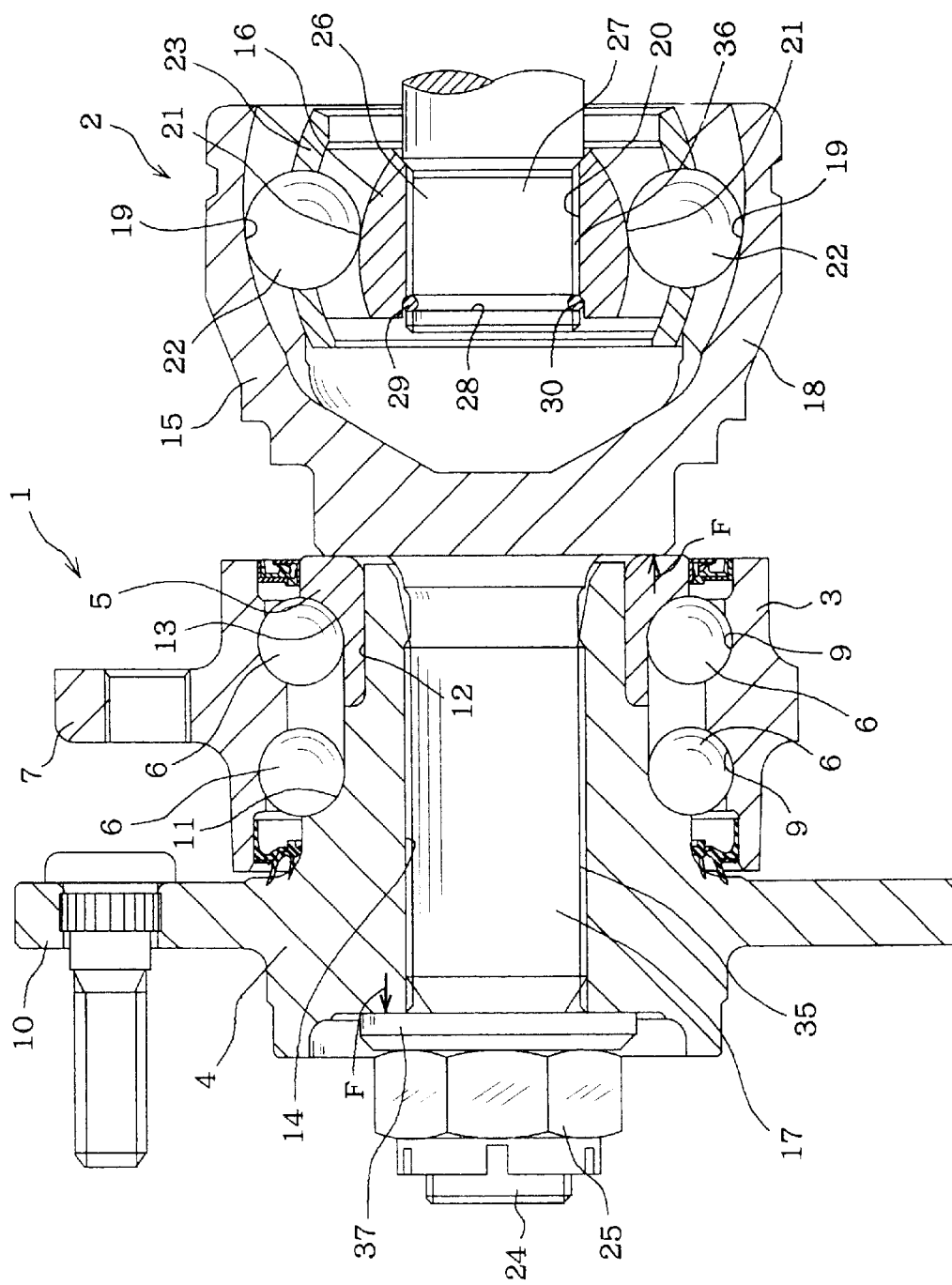
FIG. 3 is a cross sectional view showing a first example of the prior art structures.
Figure 4:
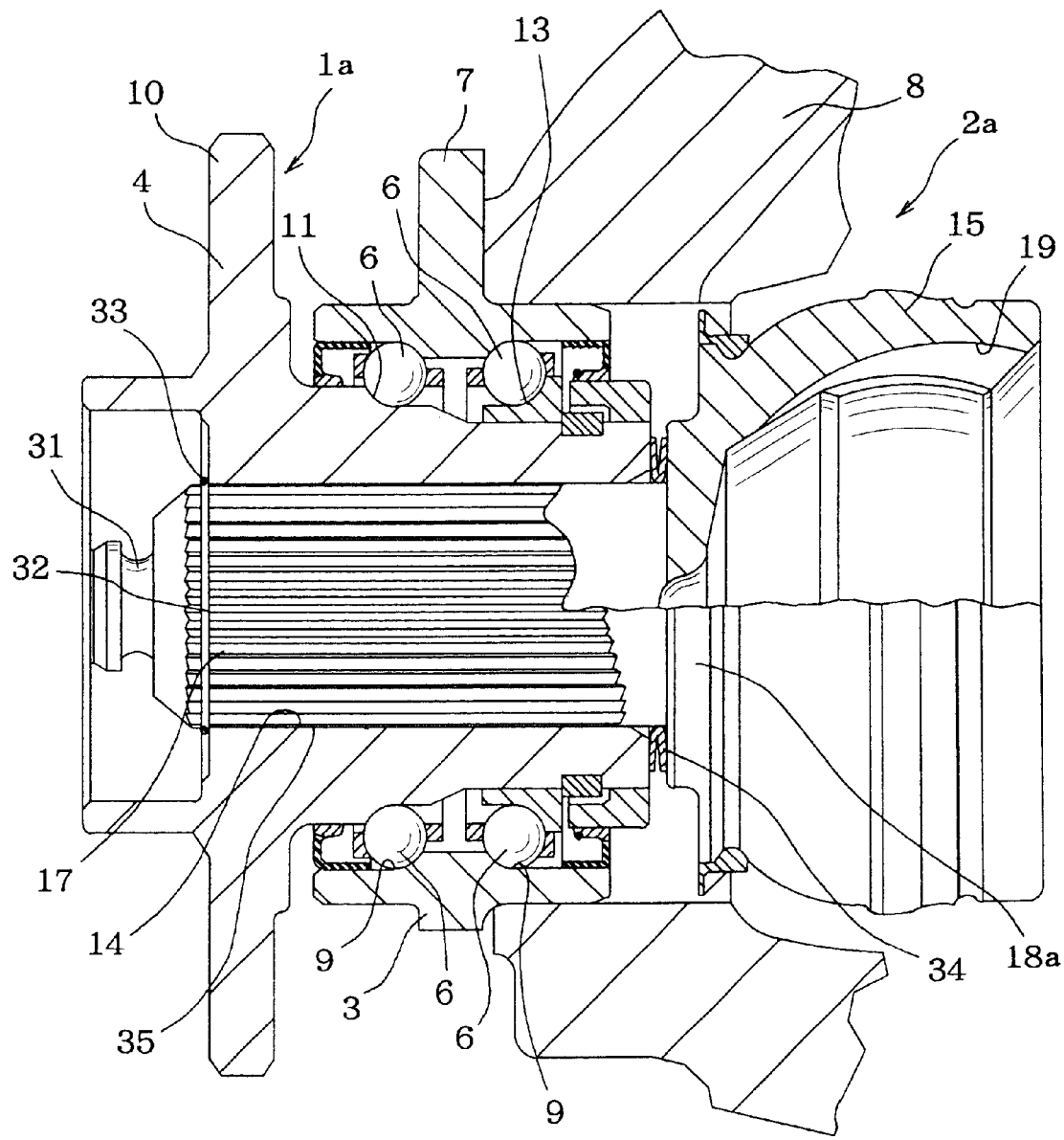
FIG. 4 is a cross sectional view showing a second example of the prior art structures.

FIG. 1 shows a first embodiment of the invention. This invention is characterized by construction that makes it possible to effectively maintain adequate durability even when the wheel-support bearing unit 1b and the constant-velocity joint 2a are fastened together by a stop ring 33a. The construction and function of other parts are nearly the same as those of the prior construction shown in FIGS. 3 and 4, so the like code numbers are given for identical parts and any redundant explanation is omitted or simplified. The following explanation centers on the features of this invention and parts that are different from the prior construction.

With this invention, in order to prevent the inner race 5 that fits over the small-diameter step section 12 formed on the inside end of the hub 4a from coming apart from this small-diameter step section 12, there is a crimped section 38 on the inside end of the hub 4a. In other words, there is a cylindrical section formed on the inside end of the hub 4a, and after the inner race 5 is fitted over the small-diameter section 12, the cylindrical section is plastically deformed outward in the radial direction to form the crimped section 38, and the surface on the inside end of the inner race 5 is held by this crimped section.

An engaging groove 32, that is the inside engaging groove mentioned above, is formed all the way around the end section (outside end) of the spline shaft 17a of the drive-shaft member 18b. When the spline shaft 17a is inserted in the first spline hole that is formed through the center of the hub 4a, the outer-diameter half of the stop ring 33a, whose inner-diameter half is fastened to the engaging groove 32, fits with the fitting step section 39 that is formed around the inner peripheral surface on the outside end of the hub 4a, so that the spline shaft 17a is prevented from coming out of the first spline hole 14. The fitting step section 39 corresponds to the outer-diameter fitting section previously mentioned. There is no spline formed in the center hole of the hub 4a at the section from the fitting step section 39 to the opening on the outside end, and it is a simple cylindrical surface.

The stop ring 33a is attached to the engaging groove 32 before the spline shaft 17a is inserted into the first spline hole 14. When inserting the spline shaft 17a into the first spline hole 14, the diameter of the stop ring 33a is elastically compressed as it passes through the first spline hole 14. After the stop ring 33a has passed through the spline hole 14, it is elastically restored to its original shape, and as described above, fits between the engaging groove 32 and the fitting step section 39. In order to do this, the diameter of the groove bottom in the engaging groove 32 is made sufficiently small.

Moreover, the opening on the outside end of the center hole in the hub 4a is covered by a cap 40. On the other hand, the seal ring 41, that is located between the inside surface of the crimped section 38 and the surface of the outside end of the outer ring 15 for the constant-velocity joint, is elastically compressed and then installed between these surfaces, and it covers the space between the crimped section and the outer ring 15 for the constant-velocity joint. The cap 40 and seal ring 41 prevent foreign matter, such as rain water, from getting inside the spline fitting section 35 on the hub side between the spline 17a and the first spline hole 14, and prevent this spline fitting section 35 on the hub side from rusting.

In this way, when the spline shaft 17a is prevented from coming out of the first spline hole 14 by the stop ring 33a, and with the seal ring 41 attached between the inside surface of the crimped section 38 and the surface on the outside end of the outer ring 15 for the constant-velocity joint, there exists a space between the inside surface of the crimped section 38 and a step section 42 that is formed on the outer surface in the middle of the drive-shaft member 18b. In this invention, the dimension of this space in the thrust direction is kept to 0.8 mm or less. The reason for this is, to prevent wear of the spline fitting section 35 on the hub side regardless of displacement due to the thrust load applied during operation, and to prevent the seal ring 41 from being over compressed even when the hub 4a and the drive-shaft member 18b come close together to the point where the inside surface of the crimped section 38 comes in contact with the step section 42 due to the thrust load. The reason the step section 42 on the drive-shaft member is tapered is to make this step section 42 inclined to correspond with the radially inner section of the crimped section 38, in order to make it possible in a small cross-sectional height to install the seal ring 41, and to set the step section 42 for controlling the movement in the axial direction.

Furthermore, with the wheel-drive apparatus for an automobile of this invention, the minimum outer diameter of the base (inside end) of the spline shaft 17a is larger than the groove diameter of the male spline 27 that is formed on the outside end of the drive shaft 26. In other words, at the base of the spline shaft 17a, there are two cylindrical portions, one of which is a neck or constricted section 43 with a minimum outer diameter slightly larger than the groove diameter of the male spline in order to provide relief when forming the male spline on the spline shaft 17a by a broaching process. The outer diameter $D_{43}$ of this neck section 43 is larger than the groove diameter $D_{27}$ of the male spline 27 by a range of 1 to 3 mm, or preferably, 2 mm ($D_{43} \approx D_{27}+2$ mm). This dimension is for a typical wheel-drive apparatus for an automobile.

With the wheel-drive apparatus for an automobile of this invention. constructed as described above, it is possible to maintain the strength of the splint shaft 17a of the drive-shaft member 18b during operation, even in the structure where the wheel-support bearing unit 1b and the constant-velocity joint 2a are fastened together by a stop ring 33a so that the construction of the apparatus is made more compact and lightweight. In other words, by the amount that the outer diameter of the weakest section or neck section 43, that is formed on the base end of the spline shaft 17a, is increased, it is made possible to prevent the strength of the neck section 43 from becoming severely less than the strength of the outside end of the drive shaft 26. Therefore, the durability of part of the components of the wheel-drive apparatus for an automobile of this invention is prevented from becoming severely less than the durability of other parts, and thus it is possible to maintain the durability of the entire wheel-drive apparatus for an automobile regardless of the bending moment that is repeatedly applied during operation. The spline shaft 17a can be processed by rolling. In that case, there is no need for relief, so it is possible to make the dimension of the diameter at the base end such that it is the average value of the spline groove diameter and outer diameter, however, this kind of shape has a high concentrated stress coefficient regardless of the outer diameter being increased, and it has been experimentally confirmed that the strength decreases. So, even if the spline shaft 17a is processed by rolling, it is preferable to form a neck section. In that case, the outer diameter $D_{43}$ of the neck section 43 should be larger than the groove diameter $D_{27}$ of the male spline 27 to equalize the each strength also.

Figure 2:
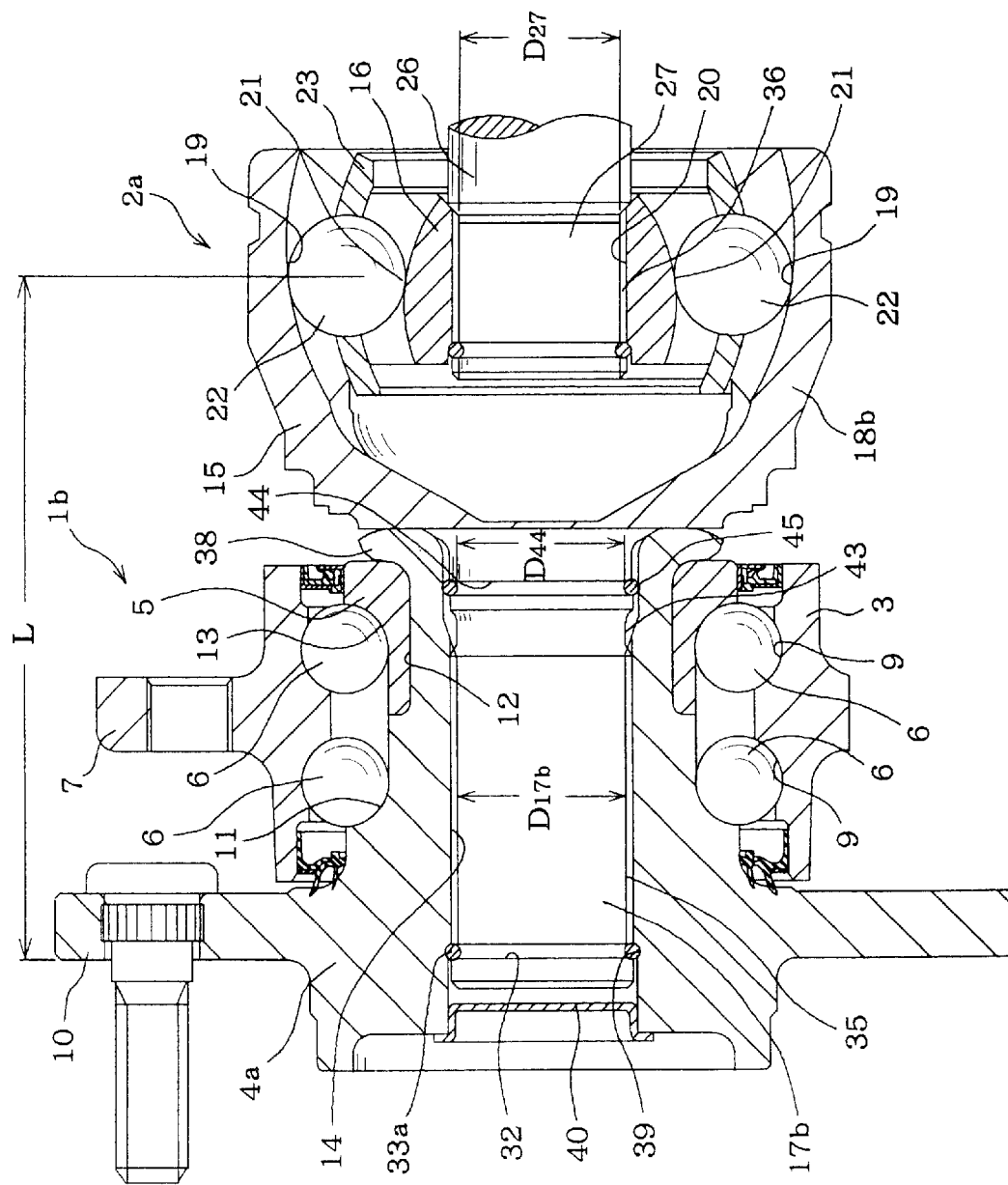
FIG. 2 is a cross sectional view showing a second example of the embodiment of the present invention.

Next, FIG. 2 shows a second embodiment to the invention. In this embodiment, an engaging groove 44 is formed all the way around the base end of the spline shaft 17b. The space between the outer peripheral surface on the base end of the spline shaft 17b and the inner peripheral surface on the inside end of the hub 4a is sealed by an O-ring 45 that fits in the engaging groove 44. The O-ring 45 corresponds to the seal ring previously mentioned. Moreover, the seal ring 41 (see FIG. 1), as described in the first embodiment, is omitted. In this embodiment, the groove diameter $D_{44}$ of the engaging groove 44 is larger than the groove diameter $D_{27}$ of the male spline 27 that is formed on the outside end of the drive shaft 26 by 1 to 3 mm, and preferably 2 mm ($D_{44} \approx D_{27}+2$ mm). In addition, in this embodiment, the spline diameter $D_{17b}$ of the spline shaft 17b is larger than the diameter $D_{27}$ of the male spline 27 by 4 mm ($D_{17b} \approx D_{27}+4$ mm). In order that it is possible to sufficiently maintain the diameter $D_{44}$ of the groove bottom in this engaging groove 44 when this engaging groove 44 is formed, a relatively thin ring with cross-sectional diameter of about 3 mm in uncompressed state is used as the O-ring 45.

Incidentally, in this example, there are four cylindrical portions at the base (from portion 43 to portion 44) of the spline shaft 17b, and the minimum diameter in the cylindrical portions is the minimum outer diameter of the base.

With the construction of this embodiment, in addition to the function and effects that are the same as the first embodiment, the following function and effects can be obtained. In this embodiment, by the fact that the seal construction, for preventing foreign matter from getting into the spline fitting section 35 on the hub side, is located in the radial direction, it is possible to reduce the distance L between the center of displacement of constant-velocity joint 2a and the installation surface of the second flange 10 for supporting the wheel, more than when the construction is in the thrust direction as described for the first embodiment. Therefore, it is possible to reduce the force (steering moment) required for moving the hub 4a, that applies the steering angle, back and forth around the center of displacement. This contributes to reducing the overall weight of the automobile by making it possible to make the power-steering apparatus more compact. In the case of this embodiment, the inside surface of the crimped section 38 that is formed on the inside end of the hub 4a directly faces the surface on the outside end of the outer ring 15 for the constant-velocity joint, however, the dimensions and shapes of all the parts are precisely regulated such that the space existing between these surfaces is within 0.5 mm, in order to control the movement in the axial direction of the spline fitting section 35 on the hub side.

The wheel-drive apparatus for an automobile of this invention functions as described above, so it is possible to maintain sufficient durability even when the wheel-support bearing unit is fastened to the constant-velocity joint by a stop ring, and the apparatus is made more compact and lightweight.

What is claimed is:

1. A wheel-drive apparatus for an automobile comprising;
an outer race having an outer peripheral surface on which a first flange is provided to be fixedly connected to a suspension, and an inner peripheral surface on which outer ring raceways in rows are formed, the outer race being not rotatable during use,
a hub having an outer peripheral surface on which a second flange is provided to support a wheel at an outside end portion thereof, and a first inner ring raceway is formed at a middle portion thereof, and an inner race is provided at an inside end portion thereof, the inner race being fixedly fitted onto the hub and having an outer peripheral surface on which a second inner ring raceway is formed, and the first inner ring raceway being formed directly on the hub or on a separate inner race provided on the hub, and the hub having a first spline hole formed at the center thereof,
a plurality of rolling members rotatably provided between the outer ring raceways and the first and second inner ring raceways, respectively,
a drive shaft member having an outside end formed with a spline shaft for engagement with the first spline hole, and an inside end formed in an outer ring for a constant velocity joint,
the spline shaft having an outer peripheral surface on which a radially inside fitting portion is formed at the outside end thereof,
the hub having an inner peripheral surface on which a radially outside fitting portion is formed at a portion facing the radially inside fitting portion,
a stop ring provided between and engaged with the radially inside fitting portion and the radially outside fitting portion to prevent the spline shaft from coming away from the first spline hole,
the outer ring for the constant velocity joint having an inner peripheral surface formed with an outside engaging groove at locations in the circumferential direction, and the outside engaging groove directed orthogonal to the circumferential direction,
an inner ring for the constant velocity joint provided on the radially inside of the outer ring for the constant velocity joint, and having a second spline hole at the center thereof, and an outer peripheral surface on which an inside engaging groove is formed at a portion in alignment with the outside engaging groove, and the inside engaging groove directed orthogonal to the circumferential direction,
a plurality of balls provided between the outside engaging groove and the inside engaging groove to be rotatable along the engaging grooves, and
a drive shaft having an outside end formed with a male spline portion in spline-engagement with the second spline hole, and the male spline portion having a groove bottom with a diameter, and
the spline shaft having a base end the minimum outer diameter of which is larger than the diameter of the groove bottom of the male spline portion.

2. A wheel-drive apparatus for an automobile comprising;
an outer race having an outer peripheral surface on which a first flange is provided to be fixedly connected to a suspension, and an inner peripheral surface on which outer ring raceways in rows are formed, the outer race being not rotatable during use,
a hub having an outer peripheral surface on which a second flange is provided to support a wheel at an outside end portion thereof, and a first inner ring raceway is formed at a middle portion thereof, and an inner race is provided at an inside end portion thereof, the inner race being fixedly fitted onto the hub and having an outer peripheral surface on which a second inner ring raceway is formed, and the first inner ring raceway being formed directly on the hub or on a separate inner race provided on the hub, and the hub having a first spline hole formed at the center thereof,
a plurality of rolling members rotatably provided between the outer ring raceways and the first and second inner ring raceways, respectively,
a drive shaft member having an outside end formed with a spline shaft for engagement with the first spline hole, and an inside end formed in an outer ring for a constant velocity joint, the spline shaft having an outer peripheral surface on which a radially inside fitting portion is formed at the outside end thereof, the hub having an inner peripheral surface on which a radially outside fitting portion is formed at a portion facing the radially inside fitting portion, a stop ring provided between and engaged with the radially inside fitting portion and the radially outside fitting portion to prevent the spline shaft from coming away from the first spline hole, the outer ring for the constant velocity joint having an inner peripheral surface formed with an outside engaging groove at locations in the circumferential direction, and the outside engaging groove directed orthogonal to the circumferential direction, an inner ring for the constant velocity joint provided on the radially inside of the outer ring for the constant velocity joint, and having a second spline hole at the center thereof, and an outer peripheral surface on which an inside engaging groove is formed at a portion in alignment with the outside engaging groove, and the inside engaging groove directed orthogonal to the circumferential direction, a plurality of balls provided between the outside engaging groove and the inside engaging groove to be rotatable along the engaging grooves, and a drive shaft having an outside end formed with a male spline portion in spline-engagement with the second spline hole, and the male spline portion having a groove bottom with a diameter, and the spline shaft having a base end the minimum outer diameter of which is larger than the diameter of the groove bottom of the male spline portion, wherein the base end of the spline shaft has an engaging groove formed generally along the circumference thereof so as to mount a seal ring in it for sealing between the outer peripheral surface of the base end of the spline shaft and the inner peripheral surface of the hub, and the engaging groove has a groove bottom the diameter of which is larger than the diameter of the groove bottom of the male spline portion at the outside end of the drive shaft.

* * * * *